(12) United States Patent
Levi Acobas

(10) Patent No.: US 6,723,409 B2
(45) Date of Patent: Apr. 20, 2004

(54) UNIVERSAL UNDER-PACKING FOR RUBBER-COATED FABRICS ON OFFSET PRINTING PRESS CYLINDERS

(75) Inventor: Roberto Levi Acobas, Milan (IT)

(73) Assignee: Printgraph Waterless S.r.l., Milan (IT)

( * ) Notice: Subject to any disclaimer, the term of this patent is extended or adjusted under 35 U.S.C. 154(b) by 0 days.

(21) Appl. No.: 10/191,349

(22) Filed: Jul. 8, 2002

(65) Prior Publication Data

US 2003/0099801 A1 May 29, 2003

(30) Foreign Application Priority Data

Nov. 27, 2001 (EP) .............................. 01128101

(51) Int. Cl.⁷ .............................................. B32B 25/04
(52) U.S. Cl. ................. 428/40.1; 101/415.1; 101/492; 101/493; 428/41.6; 428/41.8; 428/42.1; 428/354
(58) Field of Search ................. 428/40.1, 41.6, 428/41.8, 42.1, 354; 101/415.1, 492, 493

(56) References Cited

U.S. PATENT DOCUMENTS 2,556,511 A    6/1951  Affolter ................. 101/401.3
3,012,498 A *  12/1961 Gurin .................... 101/415.1
3,428,517 A *   2/1969 Grupe .................... 101/415.1
5,295,436 A     3/1994 Kittsteiner et al. ...... 101/415.1

FOREIGN PATENT DOCUMENTS

| DE | 9214503   | 1/1993   |
| EP | 0842774   | 5/1998   |
| JP | 11-227357 | * 8/1999 |

* cited by examiner

Primary Examiner—Nasser Ahmad
(74) Attorney, Agent, or Firm—Steinberg & Raskin, P.C.

(57) ABSTRACT

Sheets of rubber-coated fabric are mounted on the cylinders of offset printing presses. An under-packing formed from the combination of an optional flexible supporting sheet and a plurality of flexible packing sheets is interposed between the cylinder surface and the rubber-coated fabric to obtain a predetermined total thickness which varies for different types of printing presses. The thickness of the under-packing is equal to a predetermined maximum thickness. The thickness of the sheets of the under-packing is chosen such that by removing one or more packing sheets from the under-packing, the desired thickness for any specific case can be approximated. A face of each packing sheet which faces inwards, with the exception of the face of the innermost sheet or the supporting sheet if the supporting sheet is the innermost sheet, is treated with an adhesive which, while maintaining the sheets united, enables them to be separated from each other.

19 Claims, 1 Drawing Sheet

UNIVERSAL UNDER-PACKING FOR RUBBER-COATED FABRICS ON OFFSET PRINTING PRESS CYLINDERS

FIELD OF THE INVENTION

The present invention relates to so-called under-packing for rubber-coated fabrics mounted on offset printing press cylinders.

BACKGROUND OF THE INVENTION

As known to one skilled in the art, an offset printing press cylinder consists of a hollow metal cylinder rotatable about its axis and carrying on its lateral surface a rubber-coated fabric sheet (the so-called printing blanket) provided on each of its opposing sides with a metal bar, normally of aluminium, of U cross-section to enable it to be mounted over the corresponding edge of the rubber-coated fabric and then fixed to it. The two metal bars serve to fix the rubber-coated fabric sheet to said cylinder. The rubber-coated fabric from which said sheet is obtained comprises two layers, of which one is the fabric and the other is rubber (normally caoutchouc).

For each model of offset printing press its manufacturer indicates the total thickness to which the blanket cylinder has to be covered, this covering consisting not only of the aforesaid rubber-coated fabric sheet (printing blanket) but also of so-called under-packing, traditionally formed from a supporting sheet of fairly thin rubber-coated fabric (the so-called under-blanket) and a certain number of graded paper sheets of various thicknesses which the user has to choose to obtain the necessary under-packing thickness. The supporting sheet (under-blanket) may also be not present, particularly in the more modern printing presses, so that in this case the under-packing is formed only from the graded paper sheets.

These graded paper sheets are stored in various boxes, each containing a multiplicity of graded paper sheets of the same thickness. All the graded paper sheets of the same thickness have the same colour, which is different from that of the graded paper sheets of other thicknesses in order to facilitate identification.

The user covers the under-packing (consisting of the under-blanket and the graded paper sheets) with the sheet of rubber-coated fabric (printing blanket), and fixes it to the impression cylinder by the said end metal bars. As will be apparent, the aforedescribed operation is lengthy and requires a certain care, all of which affects to a certain degree the operating costs of the printing press.

OBJECTS AND SUMMARY OF THE INVENTION

The object of the present invention is to substantially simplify and accelerate such an operation, with the advantage of substantially reducing said costs.

This object is attained by the universal under-packing of the present invention, comprising a determined number of superposed flexible sheets, characterised in that:

the total thickness of the universal under-packing is equal to a predetermined maximum thickness;

the thickness of the sheets of the universal under-packing is chosen such that by removing from the universal under-packing one or more graded sheets, the thickness which has to be obtained for any specific case can be equalled or sufficiently approximated to;

that face of each of the sheets of the universal under-packing which, when the under-packing is mounted on the impression cylinder, faces inwards, but with the exception of the face of the most inner graded sheet if the supporting sheet is not present, is treated with an sticker which, while maintaining the sheets united, enables them to be separated from each other.

The most inner sheet of the universal under-packing can be a traditional supporting sheet (an under-blanket), but can also be of other suitable synthetic material of adequate thickness.

By virtue of the present invention the user can be provided with a manufactured universal under-packing as a single unit, comprising (if requested) not only the graded sheets but also a supporting sheet. The user can then, according to the type of printing press available, detach from the universal under-packing those graded sheets which need to be removed in order to obtain an under-packing of the required thickness as determined for the specific case.

It should be noted that the component sheets of the universal under-packing of the present invention can still be of paper (but treated on one of their faces with sticker), although better results can be obtained by using sheets of a suitable flexible synthetic material (for example polyurethane sheets) which are normally more resistant while being detached (if care is not taken, the paper sheets can tear), so that they are sure to remain whole and reusable.

Except for the possible support sheet, the other (graded) sheets of the universal under-packing can be all of the same thickness, provided that this is sufficiently small to enable the predetermined required thickness to be approximated to the required extent, in order to ensure proper operation of the impression cylinder.

This obviously does not mean that graded sheets of different thicknesses cannot be used.

The constituent sheets of the universal under-packing can have a specific colour, indicative of a determined sheet thickness. Each sheet can also carry a number and/or letter indicating the specific thickness. In this manner it is extremely simple for the user to how many and which graded sheets to be removed from the universal under-packing to obtain the total thickness required to cover the cylinder of a determined offset printing press.

BRIEF DESCRIPTION OF THE DRAWINGS

The invention will be more apparent from the ensuing description of one embodiment thereof. In this description reference is made to the accompanying drawing, in which.

DETAILED DESCRIPTION OF THE INVENTION

As can be seen from the figures, the piece of universal under-packing 10 comprises, in this specific case, a support sheet 12 and a multiplicity of graded sheets 14. Although as stated the sheets 14 can be of paper, they are preferably of a suitable synthetic material, of adequate flexibility and strength, they all being of the same thickness in this specific case. In particular, it has been found that a thickness of the graded sheets 14 not exceeding 0.10 mm enables those effective thicknesses encountered in practice to be approximated to a sufficiently precise extent.

Figure 1:
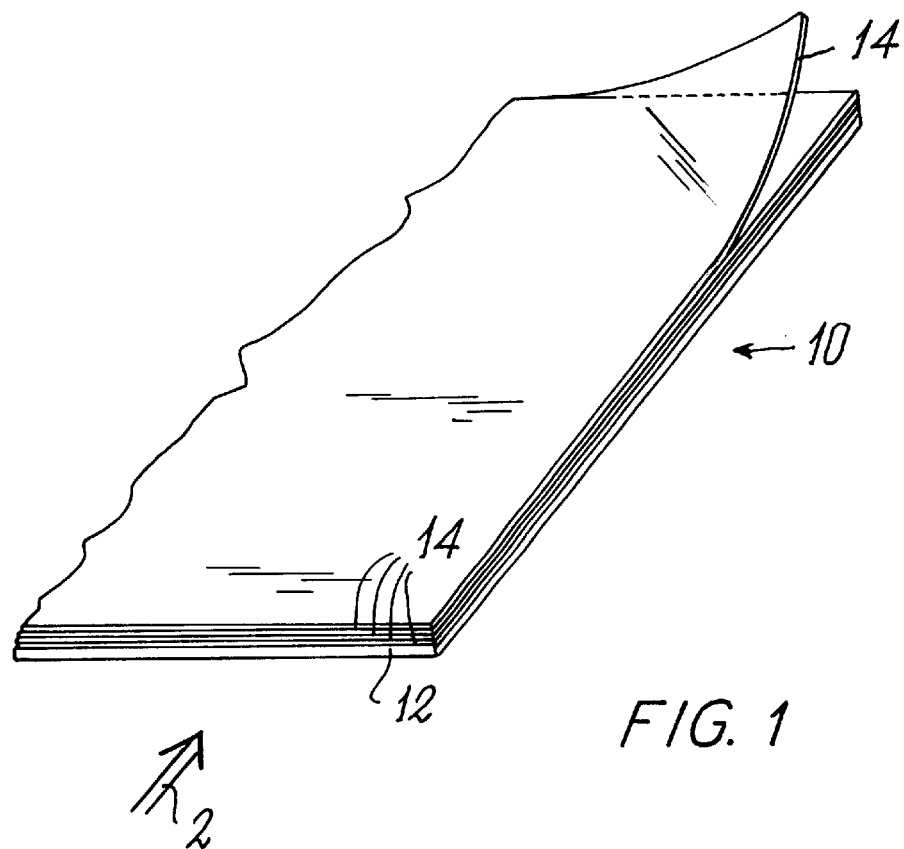
FIG. 1 is a partial perspective view of an under-packing according to the present invention.
Figure 2:
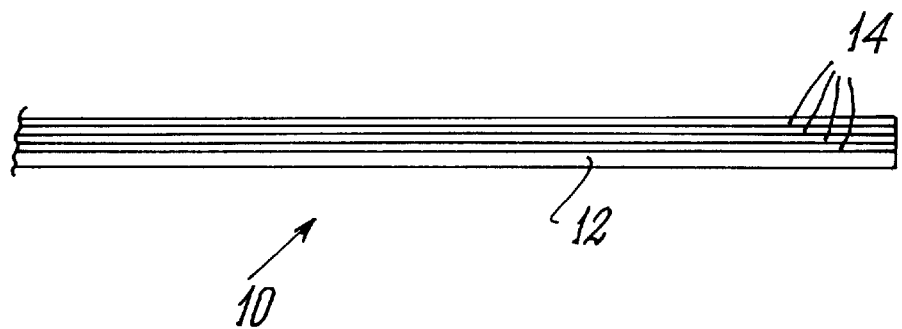
FIG. 2 is an enlarged view thereof in the direction of the arrow 2 of FIG. 1.

The supporting sheet 12 can either be a traditional under-blanket or an adequate thickness sheet of the same material as the graded sheets 14. Before forming the universal under-packing 10, a sticker layer is applied to one of the faces of the supporting sheets 14 (that which is to face downwards with reference to the figures) to enable the various sheets (12 and 14) forming the universal under-packing 10 to stay together. If the supporting sheet 12 is not present, the lowest sheet 14 (again with reference to the figures) is not treated with sticker. The sticker used is of the type which enables a sheet (12, 14) to be detached from the adjacent sheet, as indicated by the raising of the edge of the upper sheet 14 in FIG. 1.

To facilitate detachment of one or more of the graded sheets, one or more edge regions of that surface of the graded sheets which is treated with sticker (for example a small corner region) has no sticker applied.

It has been found that by producing the universal under-packing of the present invention in two suitable different thicknesses, all requirements of any user which arise in practice can be covered. This also avoids having to remove an excessive number of graded sheets when small thicknesses required. In particular, a first thickness can be 1.65 mm and a second thickness 0.70 mm.

The universal under-packing of 1.65 mm is composed for example of a supporting sheet 12 of 1.05 mm plus several graded sheets 14 of 0.05 or 0.1 mm (preferably all equal), in such a number as to arrive at the total thickness of 1.65 mm.

Likewise the under-packing of 0.70 mm can be composed of a supporting sheet of 0.35 nn and a number of graded sheets (preferably all equal) of 0.05 or 0.1 mm.

In both cases, by removing one or more graded sheets 14 an under-packing of the thickness necessary for a specific case can be obtained. As already stated, those graded sheets 14 which have been removed can be reused either to form a new universal under-packing or to be added to the afore-described second under-packing (of lesser thickness) to obtain one of greater thickness.

Finally, it should be noted that the supporting sheet 12 can be dispensed with, especially in the case of the second under-packing (of lesser thickness).

I claim:

1. A universal under-packing for rubber-coated fabrics capable of having any of a plurality of different thicknesses depending on a desired application from a maximum thickness to a minimum thickness, the under-packing being structured and arranged to be mounted on offset printing press cylinders having a lateral surface on which a rubber-coated fabric sheet fixed by two metal bars applied to parallel sides of the rubber-coated fabric sheet is mounted, the thickness of the under-packing being equal or sufficiently close to a predetermined thickness required to fill a space between the lateral surface of the cylinder and the rubber-coated fabric sheet to ensure proper operation of an impression cylinder, the under-packing comprising:

a plurality of superposed flexible sheets forming a stack of sheets having an initial thickness equal to a predetermined maximum thickness of the under-packing, at least a portion of the sheets being removably attached to one another;

the thickness of the sheets being selected such that by removing one or more of the sheets from the stack, the thickness to be obtained for any specific application can be equalled or sufficiently approximated;

each of the sheets except for an innermost one of the sheets having an inward facing face arranged in contact with an underlying adjacent sheet, adhesive being arranged on the inward facing face of each of the sheets to cause adhesion of the sheet to the adjacent underlying sheet while enabling the sheet to be detached from the adjacent underlying sheet upon application of pressure thereto, whereby a desired thickness of the under-packing less than the maximum thickness is obtained by removing one or more of the sheets from the stack until the desired thickness equals or approximates the thickness of the remaining sheets in the stack.

2. A universal under-packing as claimed in claim 1, wherein the innermost one of the sheets is a supporting sheet made of rubber-coated fabric.

3. A universal under-packing as claimed in claim 1, wherein the stack of sheets comprises packing sheets made of a flexible synthetic material.

4. A universal under-packing as claimed in claim 2, wherein the stack of sheets comprises packing sheets and the supporting sheet is made of a material equal to that of the packing sheets.

5. A universal under-packing as claimed in claim 1, wherein the stack of sheets comprises packing sheets and the packing sheets all have the same thickness.

6. A universal under-packing as claimed in claim 1, wherein the stack of sheets comprises packing sheets and the packing sheets have different thicknesses.

7. A universal under-packing as claimed in claim 6, wherein the packing sheets have a different color indicative of the specific thickness thereof.

8. A universal under-packing as claimed in claim 6, wherein the packing sheets comprise at least one of a number and a letter indicative of the specific thickness.

9. A universal under-packing as claimed in claim 1, wherein one or more edge regions of the inward facing face of the sheets treated with adhesive do not contain adhesive.

10. A universal under-packing as claimed in claim 1, which is produced in at least two different thicknesses to cover all user requirements arising in practice, to avoid having to remove an excessive number of sheets.

11. A universal under-packing as claimed in claim 10, which is produced in a first thickness of 1.65 mm and in a second thickness of 0.70 mm.

12. A universal under-packing as claimed in claim 1, wherein the stack has a thickness of 1.65 mm and comprises a supporting sheet having a thickness of 1.05 mm which constitutes the innermost one of the sheets and a number of packing sheets each having a thickness of 0.05 or 0.10 mm.

13. A universal under-packing as claimed in claim 1, wherein the stack has a thickness of 0.70 and comprises a supporting sheet having a thickness of 0.35 mm which constitutes the innermost one of the sheets and a number of packing sheets each having a thickness of 0.05 or 0.10 mm.

14. A universal under-packing as claimed in claim 10, which is produced in two different thicknesses.

15. A universal under-packing as claimed in claim 1, wherein the stack has a thickness of 1.65 mm.

16. A universal under-packing as claimed in claim 1, wherein the stack has a thickness of 0.70 mm.

17. A universal under-packing as claimed in claim 1, wherein each of the sheets except for an uppermost one of the sheets has an outward facing face arranged in contact with an overlying one of the sheets, the adhesive being arranged on only the inward facing face of each of the sheets.

18. A universal under-packing for rubber-coated fabrics capable of having any of a plurality of different thicknesses depending on a desired application from a maximum thickness to a minimum thickness, the under-packing being structured and arranged to be mounted on offset printing press cylinders having a lateral surface on which a rubber-coated fabric sheet fixed by two metal bars applied to parallel sides of the rubber-coated fabric sheet is mounted, the thickness of the under-packing being equal or sufficiently close to a predetermined thickness required to fill a space between the lateral surface of the cylinder and the rubber-coated fabric sheet to ensure proper operation of an impression cylinder, the under-packing comprising:

a supporting sheet made of rubber-coated fabric; and a plurality of superposed flexible packing sheets arranged on said supporting sheet and forming together with said supporting sheet a stack of sheets having an initial thickness equal to a predetermined maximum thickness of the under-packing;

the thickness of the packing sheets being selected such that by removing one or more of the packing sheets from the stack, the thickness which has to be obtained for any specific application can be equalled or sufficiently approximated;

each of the packing sheets having an inward facing face arranged in contact with an underlying adjacent sheet, adhesive being arranged on the inward facing face of each of the packing sheets to cause adhesion of the packing sheet to the adjacent underlying packing sheet while enabling the packing sheet to be detached from the adjacent underlying sheet upon application of pressure thereto, whereby a desired thickness of the under-packing less than the maximum thickness is obtained by removing one or more of the packing sheets from the stack until the desired thickness equals or approximates the thickness of the remaining sheets in the stack.

19. A universal under-packing for rubber-coated fabrics capable of having any of a plurality of different thicknesses depending on a desired application from a maximum thickness to a minimum thickness, comprising:

a plurality of superposed flexible sheets forming a stack of sheets having an initial thickness equal to a predetermined maximum thickness of the under-packing, at least a portion of the sheets being individually and sequentially separable from the stack of sheets;

the thickness of the sheets being selected such that by removing one or more of the sheets from the stack, the thickness which has to be obtained for any specific application can be equalled or sufficiently approximated;

each of the sheets except for an innermost one of the sheets having an inward facing face arranged in contact with an underlying adjacent sheet, adhesive being arranged on the inward facing face of each of the sheets to cause adhesion of the sheet to the adjacent underlying sheet while enabling the sheet to be detached from the adjacent underlying sheet upon application of pressure thereto, whereby a desired thickness of the under-packing less than the maximum thickness is obtained by removing one or more of the sheets from the stack until the desired thickness equals or approximates the thickness of the remaining sheets in the stack.

* * * * *

UNITED STATES PATENT AND TRADEMARK OFFICE
CERTIFICATE OF CORRECTION

PATENT NO. : 6,723,409 B2
DATED : April 20, 2004
INVENTOR(S) : Roberto Levi Acobas It is certified that error appears in the above-identified patent and that said Letters Patent is hereby corrected as shown below:

Title page,
Item [30], Foreign Applications Priority Data, should read
-- Nov. 27, 2001 (EP) ………..01128101.1 --.

Signed and Sealed this

Twentieth Day of July, 2004

JON W. DUDAS
*Acting Director of the United States Patent and Trademark Office*